(12) United States Patent
Hemmelgarn et al.

(10) Patent No.: US 9,180,632 B2
(45) Date of Patent: Nov. 10, 2015

(54) COMPOSITE SELF-HEALING SYSTEM

(71) Applicant: Cornerstone Research Group, Inc., Dayton, OH (US)

(72) Inventors: Christopher Douglas Hemmelgarn, Miamisburg, OH (US); Thomas Wood Margraf, Centerville, OH (US); David Ernest Havens, Bellbrook, OH (US); John Lewis Reed, West Salem, OH (US); Logan Wayne Snyder, Fairborn, OH (US); Anthony Louderbough, Cincinnati, OH (US); Benjamin Allen Dietsch, Dayton, OH (US)

(73) Assignee: Cornerstone Research Group, Inc., Dayton, OH (US)

( * ) Notice: Subject to any disclaimer, the term of this patent is extended or adjusted under 35 U.S.C. 154(b) by 0 days.

(21) Appl. No.: 14/198,091

(22) Filed: Mar. 5, 2014

(65) Prior Publication Data
US 2014/0186476 A1 Jul. 3, 2014

Related U.S. Application Data

(62) Division of application No. 12/594,624, filed as application No. PCT/US2008/060055 on Apr. 11, 2008, now abandoned.

(60) Provisional application No. 60/911,673, filed on Apr. 13, 2007, provisional application No. 60/911,682, filed on Apr. 13, 2007, provisional application No. 60/911,665, filed on Apr. 13, 2007.

(51) Int. Cl.
*B29C 73/18* (2006.01)
*B29C 35/02* (2006.01)
(Continued)

(52) U.S. Cl.
CPC ............ *B29C 73/18* (2013.01); *B29C 35/0272* (2013.01); *B29C 73/22* (2013.01); *B32B 43/00* (2013.01)

(58) Field of Classification Search
CPC .... B29C 35/0272; B29C 73/22; B29C 73/18; B32B 43/00
See application file for complete search history.

(56) References Cited

U.S. PATENT DOCUMENTS 4,438,254 A 3/1984 Doorakian et al.
4,647,648 A 3/1987 Silvis et al.
(Continued)

FOREIGN PATENT DOCUMENTS

JP 2000281803 A 10/2000
WO 2005066244 A2 7/2005
(Continued)

OTHER PUBLICATIONS

Stephen James Kapitsa, Jr., "Self-Healing of Thermoplastic Poly (Ethylene-co-Meth acrylic Acid) Copolymers Following Projectile Puncture", Thesis, Master of Science in Engineering Mechanics, Virginia Polytechnic Institute and State University, Sep. 1, 2003, Blacksburg, Virginia, 67 pp.
(Continued)

*Primary Examiner* — Alexander Satanovsky
(74) *Attorney, Agent, or Firm* — Dinsmore & Shohl LLP

(57) ABSTRACT

An advanced reflexive structure system is disclosed. The reflexive system mimics the pain withdrawal reflex on which the human body relies. The reflexive system incorporates a continuous health and performance monitoring system via an embedded dielectric film, an adaptive composite structure based on shape memory composite material, and an intelligence system which will be interfaced with both the health/performance sensors and the adaptive structure. When activated shape memory polymer will recover its structural integrity via shape recovery and a reptation healing process. These features enable the use of SMP as an adaptive structure in the proposed reflexive system. The development of a reflexive system for structures will enable increased safety and security and demonstrate a better understanding of integrated performance systems. This reflexive technology could find immediate implementation on all current and future systems and future implementation on platforms such as the International Space Station, Lunar, and Martian habitats.

19 Claims, 11 Drawing Sheets

(51) Int. Cl.
*B29C 73/22* (2006.01)
*B32B 43/00* (2006.01)

(56) References Cited

U.S. PATENT DOCUMENTS

| | | | |
|---|---|---|---|
| 5,149,768 A | 9/1992 | White et al. | |
| 5,164,472 A | 11/1992 | White | |
| 5,561,173 A | 10/1996 | Dry | |
| 5,575,841 A | 11/1996 | Dry | |
| 5,660,624 A | 8/1997 | Dry | |
| 5,798,409 A | 8/1998 | Ho et al. | |
| 5,814,373 A | 9/1998 | White et al. | |
| 5,989,334 A | 11/1999 | Dry | |
| 6,261,360 B1 | 7/2001 | Dry | |
| 6,746,522 B2 * | 6/2004 | Trippe et al. | 106/3 |
| 6,759,481 B2 | 7/2004 | Tong | |
| 6,858,659 B2 | 2/2005 | White et al. | |
| 7,060,140 B2 | 6/2006 | Cheng et al. | |
| 7,060,642 B2 | 6/2006 | Ochiai et al. | |
| 7,108,914 B2 | 9/2006 | Skipor et al. | |
| 7,285,306 B1 | 10/2007 | Parrish | |
| 7,286,964 B2 * | 10/2007 | Kim | 702/183 |
| 7,786,184 B2 | 8/2010 | Makino et al. | |
| 7,930,128 B2 * | 4/2011 | Beard | 702/117 |
| 2001/0047221 A1 | 11/2001 | Fowee | |
| 2004/0007784 A1 | 1/2004 | Skipor et al. | |
| 2004/0007792 A1 | 1/2004 | Harreld et al. | |
| 2004/0229295 A1 | 11/2004 | Marchitto et al. | |
| 2006/0123918 A1 * | 6/2006 | Ogisu et al. | 73/774 |
| 2006/0252852 A1 | 11/2006 | Braun et al. | |
| 2007/0079911 A1 * | 4/2007 | Browne | 148/563 |
| 2008/0006353 A1 | 1/2008 | Elzey et al. | |
| 2009/0015272 A1 * | 1/2009 | Jones et al. | 324/693 |
| 2009/0294022 A1 * | 12/2009 | Hayes et al. | 156/94 |

FOREIGN PATENT DOCUMENTS

| | | |
|---|---|---|
| WO | 2006072767 A1 | 7/2006 |
| WO | 2007002161 A2 | 1/2007 |
| WO | 2009002586 A2 | 12/2008 |

OTHER PUBLICATIONS

M.R. Kessler "Self-healing: a new paradigm in materials design", Proc. IMrchE, vol. 221, Part G: Journal of Aerospace Engineering, Published Apr. 1, 2007, pp. 479-495.

International Search Report mailed Dec. 22, 2008 in reference to International Application PCT/US2008/060055 filed Apr. 11, 2008.

* cited by examiner

COMPOSITE SELF-HEALING SYSTEM

CROSS REFERENCE TO RELATED APPLICATIONS

This application is a divisional of U.S. patent application Ser. No. 12/594,624, filed Oct. 5, 2009, which is a U.S. National Phase Entry under 35 U.S.C. §371 of International Application PCT/US2008/060055 filed Apr. 11, 2008, which claims priority from U.S. Provisional Application Ser. No. 60/911,673, filed Apr. 13, 2007, from U.S. Provisional Application Ser. No. 60/911,682, filed Apr. 13, 2007, and from U.S. Provisional Application Ser. No. 60/911,665, filed Apr. 13, 2007.

STATEMENT REGARDING FEDERALLY SPONSORED RESEARCH

This invention was made with U.S. Government support under Contract No. NNL05AA97C awarded by National Aeronautics and Space Administration and Contract No. NNL06AA07C awarded by the National Aeronautics and Space Administration to Cornerstone Research Group Inc. The U.S. Government has certain rights in the invention.

BACKGROUND OF THE INVENTION

1. Field of the Invention

This application relates to the self-repair of polymer and polymer composite structures. The disclosed method of achieving this is to design and incorporate smart, intelligent, and adaptive systems into the structures composed of adaptive materials such as dynamic modulus resins and composites. Such systems will allow for continuous health and performance monitoring, fast and decisive information processing to ensure that the system is "highly aware" of its current health status and unparalleled in its adaptability to damage. Currently, most state-of-the-art health monitoring technologies can only deliver the indication of damage to the human operator via visual display. An integrated system consisting of smart, adaptive, and intelligent components will enable an advanced system to sense and immediately recover from physical damage while informing the operator of the situation but not requiring a response.

2. Description of Related Art

Dynamic Elastic Modulus Resins (DMR) are resins whose elastic modulus changes with a change in temperature of the resin. One such DMR is shape memory polymer (SMP). Shape memory materials were first developed about twenty-five (25) years ago and have been the subject of commercial development in the last fifteen (15) years. Shape memory materials derive their name from their inherent ability to return to their original "memorized" shape after undergoing a shape deformation. There are principally two types of shape memory materials, shape memory alloys (SMAs) and shape memory polymers (SMPs).

SMAs and SMPs that have been pre-formed can be more easily deformed to a desired shape above their glass transition temperature (Tg). The SMA and SMP must remain below, or be quenched to below, the Tg while maintained in the desired shape to "lock" in the deformation. Once the deformation is locked in, the SMA, because of its crystalline network, and the SMP, because of its polymer network, cannot return to a relaxed state due to thermal barriers. The SMA and SMP will hold its deformed shape indefinitely until it is heated above its Tg, whereupon the SMA and SMP stored mechanical strain is released and the SMA and SMP returns to its pre-formed, or memory, state.

There are principally two types of plastics, thermoset resins and thermoplastic resins, each with its own set of unique characteristics. Thermoset resins, for example polyesters, are liquids that react with a catalyst to form a solid, and cannot be returned to their liquid state, and therefore, cannot be reshaped without destroying the polymer networks. Thermoplastics resins, for example PVC, are also liquids that become solids. But unlike thermoset resins, thermoplastics are softened by application of heat or other catalysts. Thermoplastics can be heated, reshaped, heated, and reshaped over and over.

SMPs used in the presently disclosed method and devices are unique thermosetting polymers that, unlike traditional thermosetting polymers, can be reshaped and formed to a great extent because of their shape memory nature and will not return to a liquid upon application of heat. Thus by creating a shape memory polymer that is also a thermosetting polymer, designers can utilize the beneficial properties of both thermosetting and thermoplastic resins while eliminating or reducing the unwanted properties. Such polymers are described in U.S. Pat. No. 6,759,481 issued to Tong, on Jul. 6, 2004 which is incorporated herein by reference. Other thermoset resins are seen in PCT Application No. PCT/US2006/062179, filed by Tong, et al on Dec. 15, 2006; and PCT Application No. PCT/US2005/015685 filed by Tong et al, on May 5, 2005 of which both applications are incorporated herein by reference.

Additionally DMRs and SMPs can self-heal through combination of shape memory effects and a reptation process. Reptation theory describes the snake-like large-scale motion of long-chain entangled polymers across an interface, involving interfacial bonding across a boundary. The diffusive motion of polymer segments across a boundary is increased at high temperatures in which long-chain polymers are embedded. Essentially this motion allows two polymer surfaces to bond together along their interface when placed in intimate contact above the Tg of the polymer. This phenomenon commonly referred to as "healing" is essentially the interfacial welding of two polymer surfaces through the inter-diffusion of the polymer by motions across the interface via chain reptation-type motions. This basic picture of reptation is by now experimentally verified and well-established in many contexts.

This form of healing is commonly studied when polymers are placed in contact above Tg. As samples are heated and expand, the crack surfaces come into intimate contact and healing progresses following the diffusion process described above, mending the crack. The Tong patents mentioned above can be formulated by those of skill in the art to include this self-healing feature.

There are three types of SMP's: 1) A partially cured resin, 2) thermoplastics, and 3) fully cured thermoset systems. There are limitations and drawbacks to the first two types of SMP. Partially cured resins continue to cure during operation and change properties with every cycle. Thermoplastic SMP "creeps," which mean it gradually "forgets" its memory shape over time. A thorough understanding of the chemical mechanisms involved will allow those of skill in the art to tailor the formulations of SMP to meet specific needs, although generally fully cured thermoset resin systems are preferred in manufacturing.

While SMA and SMP appear to operate similarly on the macro scale, at the molecular scale it is apparent that the method of operation of each is very different. The difference between SMA and SMP at the molecular level is in the linkages between molecules. SMA essentially has fixed length linkages that exist at alternating angles establishing in a zigzag patterned molecular structure. Reshaping is achieved by straightening the angled connections from alternating angles to straight forming a cubic like structure. This method of reshaping SMA material enables bending while limiting any local strains within the SMA materials to less than eight percent (8%) strain, as the maximum shape memory strain for SMA is eight percent (8%). This eight percent (8%) strain allows for the expansion or contraction of the SMA by only 8%, a strain that is not useful for most industrial applications. Recovery to memory shape is achieved by heating the material above a certain temperature at which point the molecules return to their original zigzag molecular configuration with significant force thereby reestablishing the memory shape. The molecular change in SMA is considered a metallic phase change from Austensite to Martensite which is defined by the two different molecular structures.

SMP has connections between molecules with some slack. When heated these links between connections are easily contorted, stretched and reoriented due to their elastic nature as the SMP behaves like an elastic material when heated, when cooled, the shape is fixed to how it was being held. In the cooled state the material behaves as a typical rigid polymer that was manufactured in that shape. Once heated the material again returns to the elastic state and can be reformed or return to the memory shape with very low force. Unlike SMA which possesses two different molecular structures, SMP is either a soft elastomer when heated or a rigid polymer when cool. Both SMA and SMP can be formulated to adjust the activation temperature for various applications. Critical to the success of the currently claimed device is thermoset SMP which provides an order of magnitude higher stiffness than previous state-of-the-art thermoplastic SMPs. This added stiffness coupled with high strain capability enables the development and use of a highly useful composite tooling technology.

Unlike SMAs, SMPs exhibit a radical change from a normal rigid polymer to a flexible elastic and back on command. SMA would be more difficult to use for most applications because SMAs do not have the ease in changing the activation temperature as do SMP's. SMAs would also have issues with galvanic reactions with other metals which would lead to long term instability. The current supply chain for SMAs is currently not consistent as well. SMP materials offer the stability and availability of a plastic and are more inert than SMAs. Additionally, when made into a composite SMPs offer similar if not identical mechanical properties to that of traditional metals and SMAs in particular. Throughout this disclosure SMP and SMP composites are used interchangeably as each can be replaced by the other depending on the specific design requirements to be met.

The term "composite" is commonly used in industry to identify components produced by impregnating a fibrous material with a thermoplastic or thermosetting resin to form laminates or layers. Generally, polymers and polymer composites have the advantages of weight saving, high specific mechanical properties, and good corrosion resistance, which make them indispensable materials in all areas of manufacturing. Nevertheless, manufacturing costs are sometimes detrimental, since they can represent a considerable part of the total costs and are made even more costly by the inability to quickly and easily repair these materials without requiring a complete, and expensive, total replacement. Because SMPs are resins, they can be used to make composites, which are referred to in this application as SMP composites.

Advanced composites, containing continuous fibers dispersed in a resin matrix material, are widely used in aerospace, sports equipment, infrastructure, automotive, and other industries both as primary and secondary load-bearing structures. These composite materials derive their excellent mechanical strength, stiffness, and other properties from a combination of the resin and reinforcement fibers used. The addition of reinforcements such as continuous fiber, fiber mats, chopped fibers, fiberglass, nanoparticles and other similar material is known. Even with nanoparticles like carbon nanotubes and carbon nano-fillers a small amount of these nano-fillers could dramatically alter the properties of a matrix resin.

A recurring issue in product applications using materials such as polymeric materials is that they tend to fail or degrade due to mechanical fatigue, mechanical impact, oxidation due to radiation or impurities, thermal fatigue, chemical degradation, or a combination of these processes. The degradation can lead to embrittlement of the polymer along with other adverse effects. The embrittlement and associated cracking can advance to a point that it causes product failure and associated replacement costs. Thermoplastic and thermoset polymer systems used in products can be particularly susceptible to these failures.

This problem is of great concern because of the widespread and intensive use in modern society of polymers and polymer composites in product components. Traditional approaches to increasing the reliability of polymeric based components and products have included a focus on suitable design enhancements and the use of incrementally improved plastics.

One recently developed process to impart self-healing capability to a polymer involves the incorporation of microcapsules containing a healing agent in a polymer matrix. When a fracture occurs in the polymer matrix in close proximity to the microcapsules the associated stresses caused by the fracture ruptures the microcapsules. As a consequence the healing agent is released from the ruptured microcapsules and contacts the fracture surfaces. At the same time the healing agent comes into contact with a polymerization agent dispersed in the polymer matrix. The polymerization agent is functionally active in the presence of various chemicals including moisture in the air. When the polymerization agent contacts the self-healing agent and promotes polymerization of the healing agent resulting in filling the crack planes of the fracture.

U.S. Pat. No. 7,285,306 issued on Oct. 23, 2007 to Parrish discloses a self-healing system for an insulation material wherein the self repair process is initiated by rupturing a plurality of microcapsules disposed on the insulation material. When a plurality of microcapsules is ruptured, reactants within the plurality of microcapsules react to form a replacement polymer in a break of the insulation material.

U.S. Pat. No. 7,108,914 issued on Sep. 19, 2006 to Skipor et al. also discloses a self-healing polymer composition containing a polymer media and a plurality of microcapsules of flowable polymerizable material dispersed in the polymer media, where the microcapsules of flowable polymerizable material containing a flowable polymerizable material and have an outer surface upon which at least one polymerization agent is chemically attached. The microcapsules are effective for rupturing with a failure of the polymeric media and the flowable polymerizable material reacts with the polymerization agent when the polymerizable material makes contact with the polymerization agent upon rupture of the microcapsules.

The principal drawback of Parrish and Skipor is that once the microcapsules have ruptured and repaired the insulation a second break or damage point at or near the first break or damage point cannot be as easily repaired because the replacement polymers in the microcapsules will have been used in the first repair.

U.S. Pat. Nos. 6,261,360; 5,989,334; 5,660,624; 5,575,841; and 5,5611,73 issued to Dry describe a cured composite matrix having a plurality of hollow release vessels usually fibers dispersed therein with the hollow fibers having a selectively releasable modifying agent contained within them a means for maintaining and modifying agent within the fibers until selectively released and a means for permitting selective release of the modifying agent from the hollow fibers into the matrix material in response to at least one predetermined external stimulus. The cured matrix materials have within them fibers capable of delivering repair agents into the matrix wherever and whenever they are needed.

While this engineered healing composite represents a very exciting advance in the self-repair of materials, it is limited to crack-type damage and would not be expected to heal the large sized projectile damage (several mm or more in diameter) or repair damage at the same point multiple times. The biggest difference between these patent and the presently disclosed system is the fact that the presently disclosed system is known to heal via a thermo-mechanical response rather than by chemical reaction.

International Application No. PCT/US2005/0198 filed Jun. 6, 2005 describes a manual process to repair damage in a material thought the application of a SMP or SMP composite patch. The pressure sensitive adhesive placed on one side of the patch bonds the patch to the damaged area, covering the damage. The SMP in the patch allows a human operator to mold the patch to accurately fit the product being repaired. This method is most useful for aesthetic repairs to a product, not for structural repairs because the damage area will remain and could propagate beyond the boundaries of the patch at a future point. Additionally this device and method of repair requires a separate piece of SMP or SMP composite and a human operator to effect repairs.

DISCLOSURE OF THE INVENTION

An advanced sense and respond technology comprised of multiple technologies to enhance survivability of future systems constructed of lightweight resins or composites is disclosed. The system is designed to react to detected damage with health monitoring by locally activating shape recovery and healing mechanisms of the adaptive polymer matrix or adaptive polymer matrix composite structure through the use of proven health monitoring technology to sense the location and significance of the damage and new healable dynamic elastic polymers and dynamic elastic polymers composites, an intelligent control system that integrates the system of technologies seamlessly and characterize the overall effectiveness.

Reflexive response to the structural damage is introduced through the design of an electronic structural control system intended to mimic the reflex action of the human body. Through this system, a response to sensed structural damage will occur when a specific damage threshold is reached. Data interpretation and response will continue throughout the monitoring process by the structural control system, but only when the sensed damage reaches a limiting threshold will the reflexive repair system be activated.

A method for designing a product which can detect damage to the product, determine a course of action to heal the damage, selectively activating the components needed to heal the damage, allowing the material to heal, and detecting when healing is complete is disclosed.

Replacing traditional metallic structures with composites offers the end user increased functionality including higher specific mechanical properties, customizable ply schedules for tailored properties, and low coefficient of thermal expansion. Introduction of composite materials into structural applications does however result in specific design considerations including failure mechanisms. The failure mechanism for composites, as compared to traditional structural materials including concrete and steel, are more difficult to predict and monitor for. This change in failure mechanism results in the necessity for expensive, and time consuming, non destructive evaluation (NDE) to monitor structural health. This requirement for NDE drives up the cost of composite integration therefore increasing the barrier to entry.

If a damage or fatigue failure is located in the structure the cost of repairing and or replacing the component can be extremely high as a result of composites strength being derived from continuous fiber paths. The breaking of these fiber paths due to a repair can result in a weakening of the structure leading to reduced service life. Potential problems also arise with composite repairs made in place. If the structure needs to remain in place during the repair, the potential exists to require in place heating and pressure to cure the repair to the composite. Also, during the repair of the composite time and money are lost as a result of the structure not being in service.

One method of achieving this is to design and incorporate smart, intelligent, and adaptive systems. Such systems will allow for continuous health and performance monitoring, fast and decisive information processing to ensure that the system is "highly aware" of its current health status and unparalleled in its adaptability to detect and repair damage. Currently, most state-of-the-art health monitoring technologies can only deliver the indication of damage to the human operator via visual display. An integrated system consisting of smart, adaptive, and intelligent components will enable an advanced mission system to sense and immediately recover from physical damage on-the-fly while informing the operator of the situation but not requiring a response. Currently there is no method of recovering from physical damage due to an unforeseen event.

Conventional solutions to the problem of composite failure mechanisms and health monitoring have focused on integrating sensors to monitor the health of the composite structure. Examples of sensors that can be incorporated into a composite for monitoring purposes include; strain gauges, piezoelectric fibers, and fiber optics. These techniques provide an adequate level of structural understanding, however still require a human operator to interpret the results and make the appropriate decision about structural capability. This process requires dedicated personnel and results in time lags between when a structure is found to be sub-par and when the structure can be repaired.

Upon determination from a human operator that a composite structure is no longer operating at 100% capacity it is required that either a new structure be fabricated to replace the failed structure or a in place repair is required. Repairs that are made while the structure is in place requires that the structure be taken out of use while a composite engineer can determine the appropriate fix for the structure and during the implementation of that repair. Currently, composite repairs can be difficult as a result of elevated temperatures required to cure composites as well as the necessity for a force to be applied during the composite cure for adequate fiber compaction. As a result of these requirements, in place composite repair can be highly costly and time consuming.

A better approach to composite repair is modular structural design that if a failure occurs in the structure, a modular section can be removed and replaced with a new section that can be fabricated at a separate location. This approach eliminates the necessity for costly in place curing equipment as well as the potential elimination of having an engineer evaluate the structure since it will be replaced with the exact material that was damaged. This process still does require the structure to be monitored by a human operator to determine if a failure has occurred as well as taking the necessary actions required to complete the structural repair. This approach also requires additional design time to ensure that each aspect of the design is modular and has the ability to be replaced section by section if required.

The reflexive system disclosed enables real time health monitoring of in use composite structures as well as the ability to repair damage thus restoring cold mechanical properties to the structure. The integration of this system eliminates the need for a dedicated user, or team of users, to monitor the results of the integrated health monitoring system as well as offers an in place repair capability. Having the repair mechanism in place greatly reduces the amount of time for repair through the elimination of needing to schedule a repair crew. Time is also saved through the way that a repair is conducted. Rather than having to either cure a composite in place or remove a section and mechanically fasten a new section into place, repairs can be completed simply through the application of heat to the structure. It is for these reasons that both time and money are saved through this technology as well as a minimization of structural down time.

The idea for self repairing composites utilizing encapsulated fibers or beads containing polymers and polymerization agent's are now widespread. However these systems are only as reliable and useful as long as there is polymer remaining encapsulated within the composite or polymer matrix. Additionally once an area has repaired the damage with current systems there is little if any polymer remaining to repair a second crack or failure at the same point. Therefore there is a need for a method and system for repairing a polymer or polymer composite repeatably without the use of micro-encapsulated resins and polymers, without the application of additional resin or composite, and without the interaction of a human operator.

MODES FOR CARRYING OUT THE INVENTION

Figure 1:
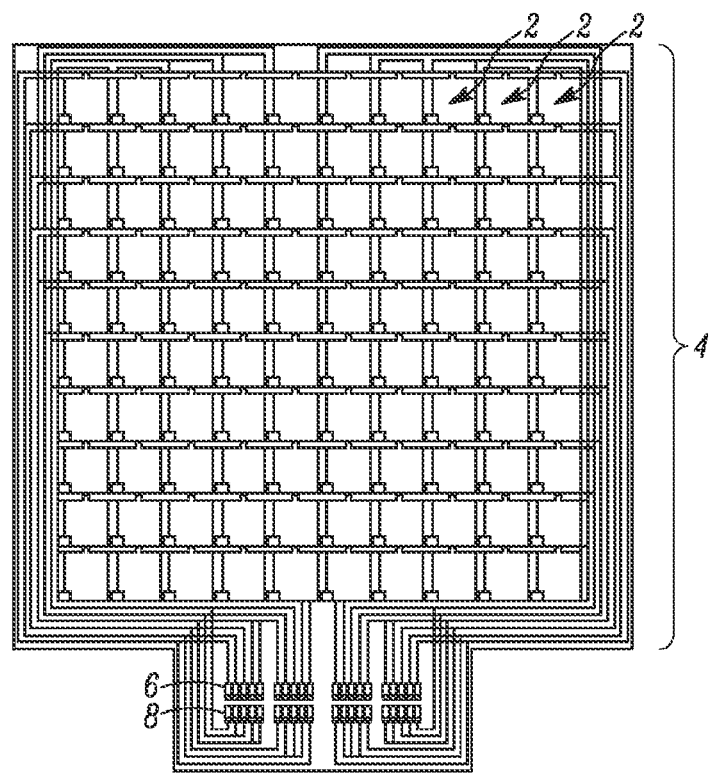
FIG. 1 shows the preferred heater panel design.

The presently disclosed method and devices utilizing the method are an advanced reflexive structure technology system which increase the survivability of systems constructed of lightweight polymer and polymer composite material. Applications of this device include a broad selection of high performance systems ranging from aircraft and spacecraft to habitats for space stations and interplanetary exploration in addition to commercial applications such as motor vehicles and building components. The control system for the reflexive structures mimics the pain withdrawal-reflex on which the human body relies. This is important because quick reaction is critical to survivability. This system combines a damage sensing technology, a control system, a dynamic elastic modulus resin (DMR) matrix or a composite in a dynamic elastic modulus resin matrix, and a means for activating the dynamic elastic modulus resin matrix.

Dynamic Elastic Modulus Resins and Composites

One element of the claimed system is an adaptive resin or composite system. The term "composite" is commonly used in industry to identify components produced by impregnating a fibrous material with a thermoplastic or thermosetting resin to form laminates or layers. Generally, polymers and polymer composites have the advantages of weight saving, high specific mechanical properties, and good corrosion resistance which make them indispensable materials in all areas of manufacturing. The use of other fabrics such as carbon nanofibers, spandex, chopped fiber, random fiber mat, fabric of any material, continuous fiber, fiberglass, or other type of textile fabric can be used to replace carbon fiber in any of the cited examples.

The preferred DMR to use in forming the resin system or composites used in the presently claimed device is shape memory polymer (SMP). SMP materials "heal" via two mechanisms. First, SMPs have memorized shapes, allowing them to return to form upon thermal activation above $T_g$. Secondly, SMPs perform a reptation process, where long polymer chains within a thermoset matrix will move freely and entangle at temperatures above the $T_g$ of the thermoset and thermoplastic. When the Tg of the SMPs are above the Tg not only does the elastic modulus of the SMP decrease dramatically, but additionally, the increase in temperature increases the mobility of the long chain polymers within the SMP across a boundary.

Because of the properties inherent in shape memory polymers, composites utilizing shape memory polymer as the resin matrix can be temporarily softened, reshaped, and rapidly hardened in real-time to function in a variety of structural configurations. SMPs can be fabricated with nearly any type of fabric, and creative reinforcements can result in dramatic shape changes in functional structures and SMPs have the additional benefit of being highly machinable.

SMAs and SMPs that have been pre-formed, with a memory shape, can be more easily deformed to a desired shape above their glass transition temperature (Tg). The SMA and SMP must remain below, or be quenched to below, the Tg while maintained in the desired shape to "lock" in the deformation. Once the deformation is locked in, the SMA, because of its crystalline network, and the SMP, because of its polymer network, cannot return to its pre-formed, or memory, shape due to thermal barriers. The SMA and SMP will hold its deformed shape indefinitely until it is heated above its Tg, whereupon the SMA and SMP stored mechanical strain is released and the SMA and SMP returns to its pre-formed, or memory, state.

Many sources claim that there is an interchangeable nature between shape memory alloys (SMA) and shape memory polymers, however, for many applications this is not so. The technical difference between SMA and SMP at the molecular level is in the linkages between molecules. SMA essentially has fixed length linkages that exist at alternating angles establishing in a zigzag patterned molecular structure. Reshaping is achieved by straightening the angled connections from alternating angles to straight forming a cubic like structure. Recovery to memory shape is achieved by heating the material above a certain temperature at which point the molecules return to their original zigzag molecular configuration with significant force thereby reestablishing the memory shape. Locally, no more that eight percent (8%) strain is recoverable with the memory effect. The molecular change in SMA is considered a metallic phase change from Austensite to Martensite which is defined by the two different molecular structures.

SMP has connections between molecules with some slack. When heated these links between connections are easily contorted, stretched and reoriented due to their elastic nature as the SMP behaves like an elastic material when heated, when cooled, the shape is fixed to how it was being held. In the cooled state the material behaves as a typical rigid polymer that was manufactured in that shape. Once heated the material again returns to the elastic state and can be reformed or return to the memory shape with very low force. Unlike SMA which possesses two different molecular structures, SMP is either a soft elastomer when heated or a rigid polymer when cool. Both SMA and SMP can be formulated to adjust the activation temperature for various applications.

Typical SMP materials can switch in elastic modulus by at least three orders of magnitude becoming at least three orders of magnitude softer than SMA materials. Although SMA materials can be switched from a slightly softer state to a stiff state, they change less than an order of magnitude remaining more stiff than SMP in the stiff state. For example, this is like the difference between inflating an aluminum soda can versus a common balloon where the balloon will expand and conform dramatically at low pressure. Conversely, an aluminum can would bulge and subsequently burst after minor shape change and higher pressure. Another example to consider would be the difference between shaping a soft sheet of rubber versus a typical sheet of metal. SMP materials have been shown to replicate complex shapes of large and small size.

SMP materials have been shown to replicate surfaces with less than 10 nanometer root mean squared surface roughness. This favorable performance characteristic enables class A finished surfaces to be achieved without subsequent surface preparation and painting typically necessary to achieve final surface qualities for composites. Not only can SMA not approach the level of surface quality performance of SMP, typical surface qualities necessary for the composite industry are not achievable with corrugated SMA.

The cost per pound differences are more than an order of magnitude greater for metals versus polymers and the difference in density adds an additional factor of six times the cost, bringing the cost advantage at the most general comparison level to 10 to 60 times in favor of SMP. This general comparison would be the best approach in considering each material in the lowest commodity level at extreme production volumes. At low volumes the cost advantage of SMP over SMA becomes more significant. Lastly considering lifecycle of the two materials used to make the same device, SMA devices may offer more cycles than an SMP device in certain cases however this advantage would be limited to no more than 2 times greater at best and only in rare situations.

If SMA was used instead of SMP for the presently claimed device the cost of the materials and production would be significantly higher. Additionally it would require at least 100,000 to 1,000,000 psi of air pressure to assist the SMA to return quickly to is memory shape and the crack would have to be repaired by a human operator on the ground. Such sources of such extremely high air pressure are not easily available and not feasible in most commercial uses such as cars, aircraft, and homes. Additionally, if the damage to an SMA results in over eight (8) percent strain, it will be impossible for the SMA to fully recover its original, memory, shape.

However, SMP in the soft state will require little, if any, air pressure to return the SMP or SMP composite to its memory shape. This amount of air pressure is readily available in most manufacturing facilities and can easily be incorporated into a commercial product. Finally, any attempt to replace SMP with thin sheets of SMA would yield a non functional product as the stiffness of the thin sheets of SMA would not provide adequate structural and mechanical properties for most applications.

Integrating thermoplastics into existing SMP resins by either dissolving commercially available thermoplastics in the resin or by in-situ polymerizing thermoplastic monomers in the resin during cure is difficult. Thermoplastics do not easily dissolve in the resin; high temperatures and extended time periods were required to dissolve relatively low amounts of thermoplastic (two to five percent (2-5%) wt). The in-situ polymerization process prevents time-consuming dissolving step; however, many new variables arise with this process, including thermoplastic monomer selection, molar ratio of monomers, total weight loading of monomers, use and loading of initiator, and cure cycle selection. Although thermoplastic networks were successfully established in the SMP matrix, the extent of reaction and repeatability of the polymerization posed issues requiring substantially more developmental time than currently described polymers.

While the styrene based SMPs described in Tong '481 are preferred, the most preferred resin system is an epoxide monomer that resembles a long thermoplastic chain but with epoxide functional groups. All monomers are low viscosity, easily dissolve in the epoxy resin, and qualitatively enhances the "stickiness" and "healing" ability of the material. The method of incorporating mono-, di-, or multi-functional long chain epoxides in the epoxy SMP matrix qualitatively gives the best healing properties. Many such epoxides are available commercially to enhance further the healing properties without sacrificing the mechanical properties of the material. The Epoxy SMP resins used are disclosed in PCT application number PCT/US2006/062179 and are commercially available from CRG Industries in Beavercreek, Ohio, U.S.A. at http://www.crg-industries.com.

Those of skill in the art should be able to select the proper material for the application based on cost, mechanical properties desired, and type of resin desired. The material selection for the disclosed device involves the selection of a resin system, the optimization of its mechanical properties, and the incorporation of self-healing mechanisms into the resin. Based on the application requirements and the wide range of resin systems available, the resin system can be designed to exhibit a $T_g$ between 0° C. and 280° C. The mechanical properties will meet or exceed those of conventional resins of the same chemistry. The elongation and recovery of the material above $T_g$ can be designed to be between 0% and 100%, allowing most minor and major deformations to return to original form.

The healing time is important to fully understand and optimize the healing cycle. In optimizing the healing times the system will only heat the damaged sections for the minimum required time. In removing excess heating time the system will require less power, therefore reducing the power draw. In addition to limiting the power draw on the system this approach also minimizes the structural change. Current reptation models show the time to heal at a boundary to be five hundredths of a second. The full healing time, which includes the time for the SMP or SMP composite to return to its memory shape, is on average 3 minutes to heal fully. The time difference is believed to stem from the time needed to heat the composite, and to cheat low heat transfer coefficients of composites.

Those of skill in the art should be able to find the time to heat and repair a given system. First the thermal conductivity, specific heat capacity and mass densities must be found in order to correctly model the time to heat the system. An infrared camera can be used to directly measure the composite. This method will utilize the Kapton® heaters to heat the bottom of the composite system while recording temperatures on the top side with the IR camera; in addition to finding the time to repair the system the IR camera will also check how evenly the composite is heated.

The currently claimed device can use either a thermoplastic or thermoset DMR, DMR composite, SMP or SMP composite in the process. The most preferred type of resin is a thermoset SMP which provides an order of magnitude higher stiffness than previous state-of-the-art thermoplastic SMPs. This added stiffness coupled with high strain capability enables the development and use of a highly useful material for use in the claimed process. Such polymers are described in U.S. Pat. No. 6,759,481 issued to Tong, on Jul. 6, 2004 which is incorporated herein by reference. Other thermoset resins are seen in PCT Application No. PCT/US2006/062179, filed by Tong, et al on Dec. 15, 2006; and PCT Application No. PCT/US2005/015685 filed by Tong et al, on May 5, 2005 of which both applications are incorporated herein by reference. All of these polymers are commercially available from CRG Industries, Inc. in Beavercreek, Ohio, U.S.A. at http://www.crg-industries.com.

Damage Detecting Sensors

Another element of the claimed system is the sensing system. Any method or means of sensing damage that can be incorporated into a product's structure will work. Most commercially available damage sensing systems use embedded piezoelectric sensors and is the preferred embodiment. One such system is made by Acellent Technology, Inc. based in Sunnyvale, Calif. Acellent Technology's sensor are the most preferred sensors to integrate into a DMR or DMR composite that can correctly identify damage and alert a controlling system of the location, amount, and type of damage present. Those of skill in the art will be able to customize a sensor system for a desired system. While placement of the damage detecting sensors can either be internal or external to the DMR or DMR composite, the preferred location is internal as discussed below.

Activation Elements

Another element needed is the means to activate the DMR. As used throughout this application the term "activate" means to enable the DMR to switch from a high elastic modulus to a low elastic modulus. As used throughout this application the term "deactivate" means to enable the DMR to switch from a low elastic modulus to a high elastic modulus.

The means for activating and deactivating the dynamic elastic modulus resin (DMR) can be thermal, light, water, electromagnetic radiation, and other means which will induce the dynamic elastic modulus resin matrix to change its elastic modulus from a hard state to a soft state and reverse that state upon application of the opposite stimulus. For thermally activated DMRs the stimulus can be the application and removal of heat. For electromagnetic radiation activated DMRs the stimulus can be application of one wavelength and energy of light and then the application of a second wavelength and energy of light. The Tong patents previously noted can create DMRs that can heal in a few minutes or less.

There are multiple means of activating and deactivating a DMR including, but not limited to, thermal energy, light, other electromagnetic wave types, magnetism, water, exposure to certain chemicals and substances, and other means which are known in the art. The most preferred method of activating and deactivating a DMR is thermal energy through the application and removal of a heat source, most preferably through resistive heating elements embedded in the product's structure.

Composite panels which integrate the activation means and the DMR or DMR composite composing of discrete heating elements through the incorporation of a foil etched Kapton® encapsulated resistive heating element is the most preferred method of applying and removing heat. The discrete heater should be integrated at the top ply of the DMR or DMR composite and processed during the DMR or DMR composite fabrication. To protect the thermoplastic coated diodes and solder pads, a layer of Kapton® film is added over the top of the heating element prior to processing. Encompassing the diodes into the package allows the discrete heater to be placed mid-ply in the composite and minimize heat energy lost to the ambient, a concern that will only amplify when dealing with forced convection during flight or other motion.

The added layer of Kapton® film is sealed to the resistive heater using tape around the perimeter. The excess tape is trimmed off leaving the bottom surface unaltered. The enclosed heating element is then placed atop the composite ply schedule of pre-preg carbon fiber and healable DMR matrix, and more preferred SMP matrix, is pressed down using a squeegee. The composite is then vacuum bagged and cured. Once the composite is cured the vacuum bag is removed and the tape can be removed from the localized heater exposing the solder points and diodes. As a result of the heater and composite being co-cured there is good adhesion between the Kapton® film and the composite panel.

The design of the preferred heater pad, 4, is shown in FIG. 1. The heater sections, 2, are evenly spread throughout the pad with the electrical bus bars, 6 and 8, providing the necessary paths for the flow of electricity to the individual heater sections, 2.

Figure 2:
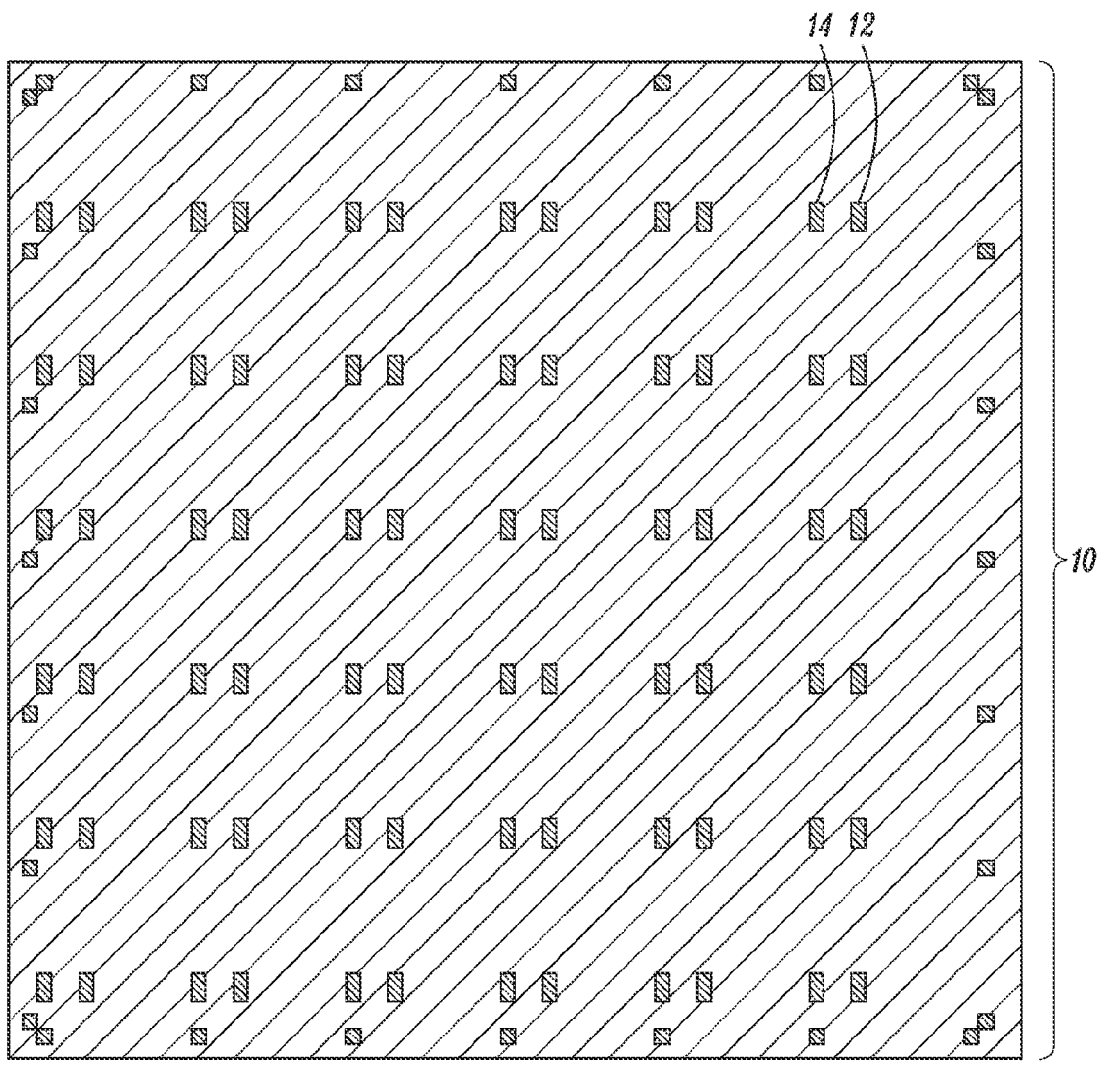
FIG. 2 shows the first layer of the preferred heater panel design.
Figure 3:
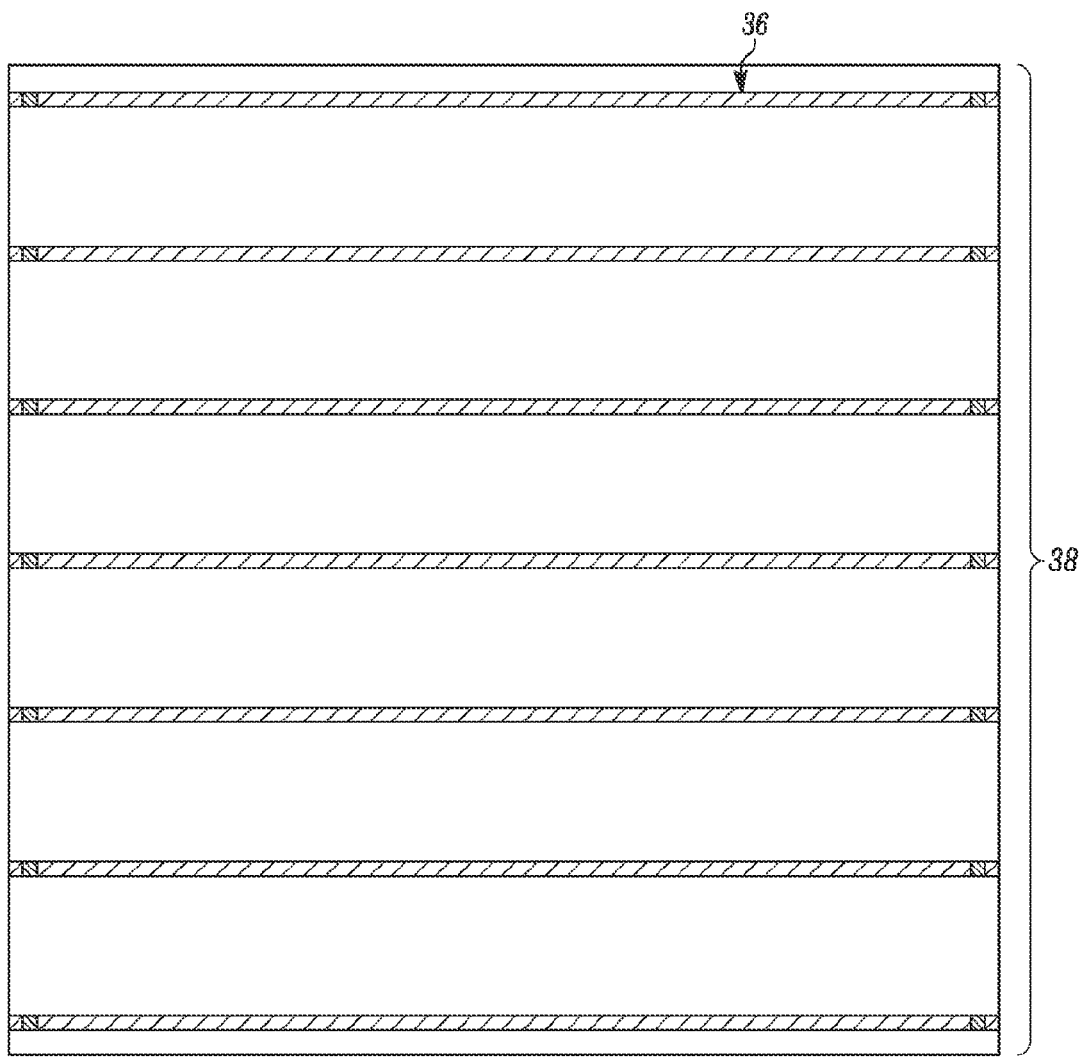
FIG. 3 shows the second layer of the preferred heater panel design
Figure 4:
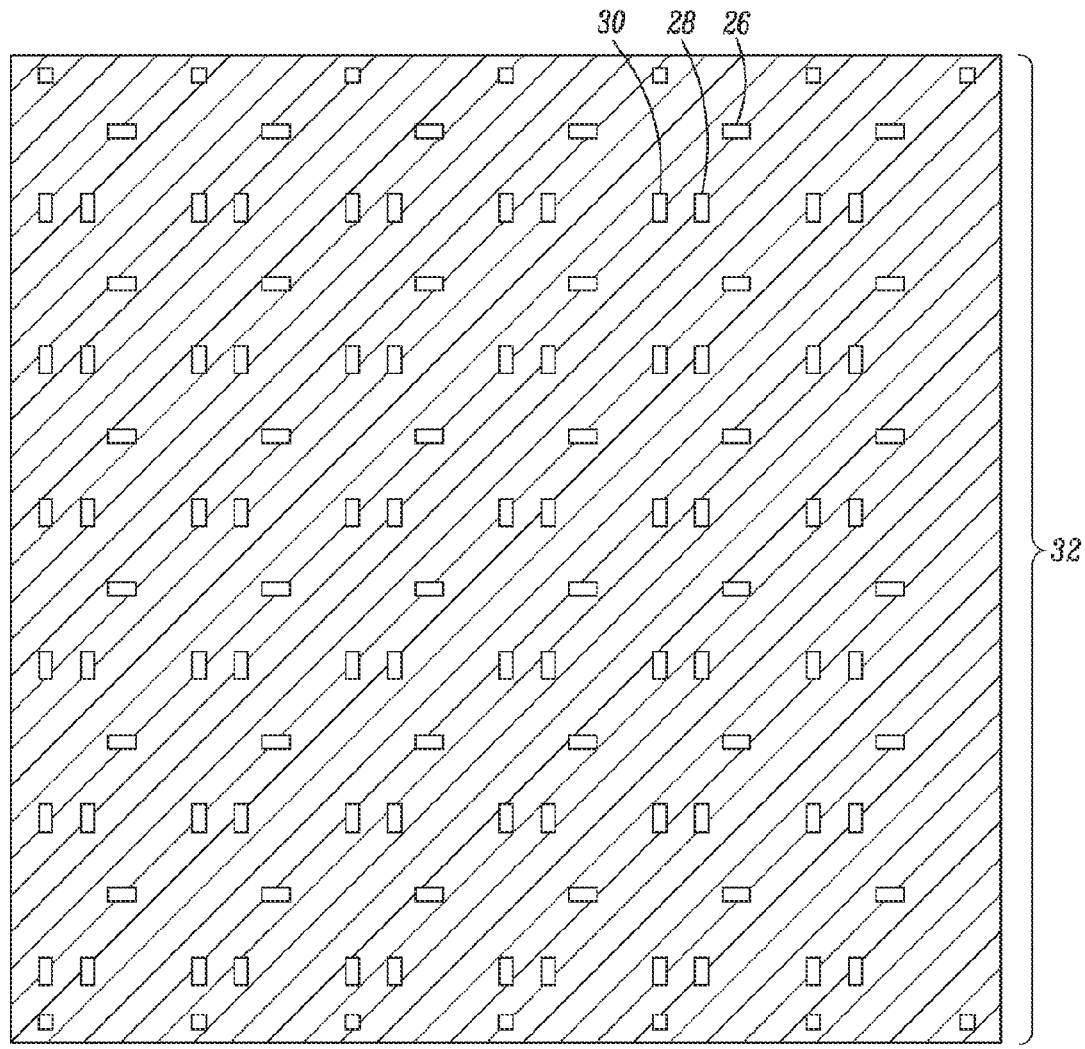
FIG. 4 shows the third layer of the preferred heater panel design
Figure 5:
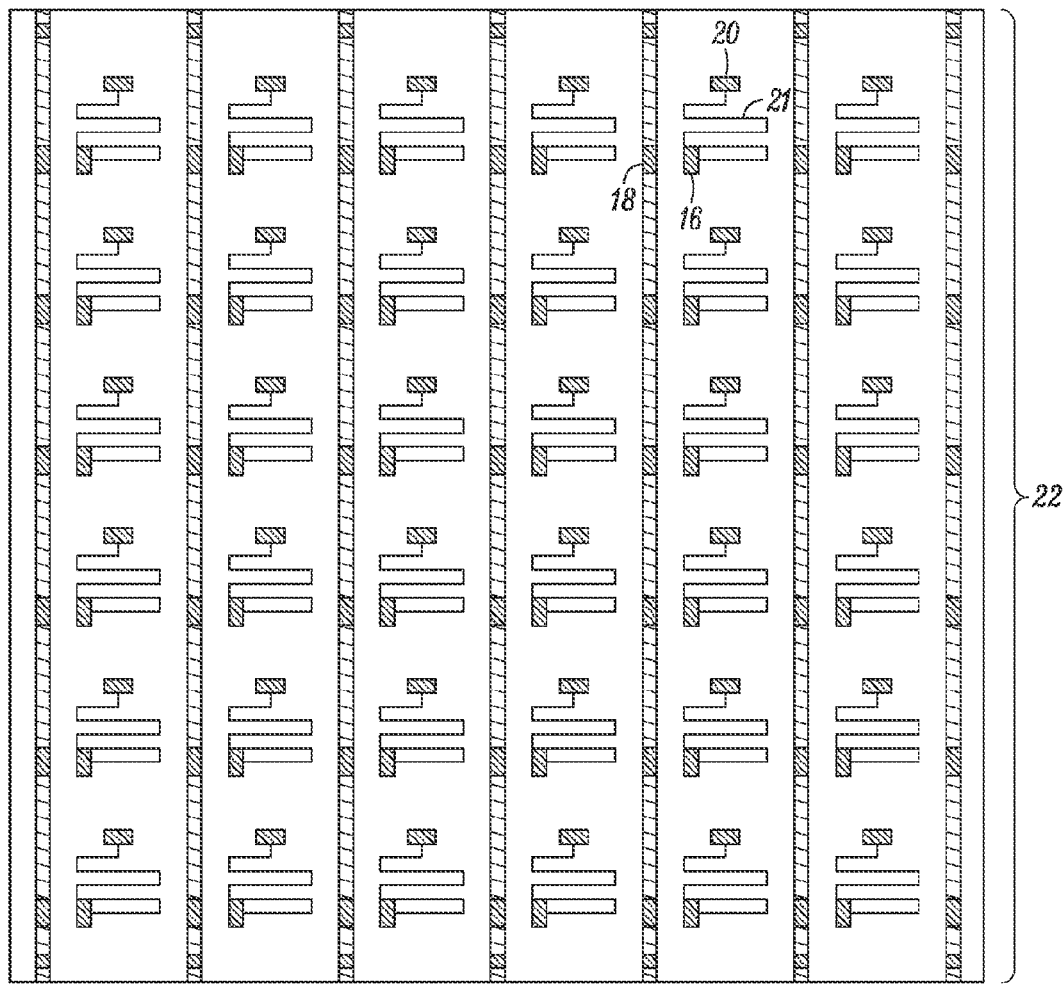
FIG. 5 shows the fourth layer of the preferred heater panel design

The layers of the heater sections are shown in FIGS. 2-5. The first layer, shown in FIG. 2, is a Kapton® layer, 10, with holes, 14 and 12, in it for electrical connections to the other layers. The leads of a diode, to prevent the two-way flow of electricity through the heaters, is passed through the holes, 14 and 12, on the first layer, 10, and holes, 30 and 28, of the third layer, 32, as shown in FIG. 4, and finally connected to the leads of the heater, 18 and 16, on the fourth layer, 22, shown in FIG. 5. FIG. 3 shows the bus bars, 38, used to allow current flow. These bus bars are sandwiched between the first and third layers so that the bus bar, 38, in FIG. 3 aligns with the hole, 26, in the third layer, 32, and the connector, 20, in the fourth layer, 22. FIG. 4 is an electrically insulating Kapton® layer, 32, to prevent the bus bars, 38, in FIG. 2, from contacting other bus bars, in FIG. 5. The holes, 30 and 28, are lined up with holes, 14 and 12, on the first layer so as to allow electrical connections between the Kapton ® layers.

The preferred design of the heating panel is an array of 64, 1 inch square resistive heating elements spaced at approximately 1.5 inch on center. The package is a 5 layer polyimide package to insulate the heating elements from the composite, insulate the bus bars from each other, and to protect the top surface from environmental degradation. Each resistive heating element is designed for 8 ohms resistance, which will provide a power density of 2 watts/in^2 when supplied with 0.5 A at 4 volts. Using the above power, localized heating of at least 115° C. can be achieved, while maintaining the temperature. temperature of surrounding elements at approximately the current environmental The preferred design uses bus bars capable of higher current draw without heating, resulting in thinner traces. This allows a user to place the heaters closer together, allowing a more finely tuned activation area when repairing damage. With the integration of the wires into the Kapton® package, the wires are run to a central location similar to the sensing layer. The Kapton® package will have receptors for solder points to attach surface mounted molex connectors that will interface directly with the intelligent control system.

Localized heating is achieved by selectively activating the heating elements. Temperatures ranging between 115° C. and 130° C. can easily be achieved and higher temperatures are possible with proper design. By increasing the power to the resistive heating element, temperatures above 130° C. can be achieved; additionally the use of variously heating elements and resin can also affect the temperatures. Those of skill in the art will be able to determine what temperatures must be obtained by the heating element to heat the entire composite panel to activation temperature. Additionally those of skill in the art will be able to determine the optimum placement in the composite for both uniform thermal distribution and composite mechanical properties.

Those of skill in the art can also design a system that reduces the parasitic weight of the discrete activation layer in the DMR or DMR composite system. The referred way to reduce this parasitic weight is to design heating elements with leads integrated into a Kapton package. These leads were designed as copper traces that were chemically etched away on a Kapton substrate. Those of skill in the art will be able to design a heating system which satisfies the needs of the system without causing damage through improper heater spacing and thermal gradients.

Incorporating the current design of the discrete heater into the mid-ply of the composite would result in shorting of the circuit due to the conductivity of the carbon fiber and the diodes being surface mounted on exposed solder pads. Also, due to the thickness of the diodes, reduced mechanical performance is also a possibility as a result of continuous fibers deflecting out-of-plane. While thin film transistor (TFT) networks to distribute electric current to discrete points to resistively heat the composite could be used, the technology is still new and bulky that lower profile diodes and diode alternatives are preferred.

Integration of Activation Element, Sensing Element, and DMR Element

The preferred panels of the reflexive structure were fabricated using 3k plain weave carbon fiber and styrene based healable SMP resin system as described in U.S. Pat. No. 6,759,481 issued to Tong by integrating Acellent's SMART Layer® sensing system at the mid-ply and the Kapton® discrete heating element at the bottom or back ply of the panels, leaving the side of the panel which will be exposed to the surrounding environment to be the resin or composite. Incorporating the non-porous resistive heating element into the composite ply schedule required the development of a process to pre-preg styrene based SMP matrix composites. The developed process used a vacuum assisted resin transfer molding (VARTM) process to infuse carbon fiber fabric with styrene SMP in a closed mold. The parts were cured for 1 hour and 45 minutes in an oven at 75° C. to gel cure the resin. The gel cured parts were then cut to shape and used in the composite ply schedule as standard pre-preg material. The parts were then vacuum bagged and fully cured in a closed mold. Precautions were taken to protect exposed electrical connections in both the heater and sensor layer by coating exposed connections with chemically resistant tape.

Once the parts were fully cured they were demolded from the vacuum bag and glass and the tape was removed exposing the electrical leads. 22-guage wire leads were soldered to the discrete heater on all 32 solder pads. Flat ribbon cable was soldered to the Acellent SMART Layer® with a male connector at one end interfacing with the Acellent hardware.

The ability of the sensing layer and Acellent health monitoring system to identify location and magnitude of structural change requires a determination of the optimal wave form to identify structural damage. The system offers a variety of potential wave forms for characterization including waves with 3, 5, and 10 peaks as well as bursts and chirps. The system also offers the capability for user defined wave forms. Resolution analysis on repeatable structural changes should be run to determine which combination of wave forms has the highest resolution of structural change.

Active scanning systems from Acellent can be used to drive a 3×3 sensor grid array that is integrated into the reflexive system panels. This Acellent active imaging system collects data from the sensor grid, and produces a ¼ inch spatial resolution data file that represents the mechanical fatigue of the respective 11-inch square inspection area.

The sensing layer is integrated at the mid-ply of the composite ply schedule to optimize sensor resolution. The sensor is integrated into the composite during the fabrication process to minimize the potential for void introduction and optimize bonding. The integration process consists of assembling the bottom plies of the composite using the carbon/Stryene SMP pre-preg then placing the sensor at the mid ply and assembling the remaining layers of the composite ply schedule on top of the sensor. Pressure is then applied between each layer with a hand squeegee to ensure good adhesion between plies. The composite panel was then vacuum bagged and cured completely.

The appropriate set of signal parameters allowing for the generation of accurate data will only be accurate for the preferred embodiment of a specific composite ply schedule of the composite panels fabricated with the sensing layer at the mid-ply; however, a process capable of reducing the amount of time needed to identify optimal parameters is disclosed. By creating a baseline data set and comparing that baseline to a future data set, a control system can automatically determine where the damage has occurred, how big the damage is, and the proper sequence to repair the damage.

This process requires an initial effort to run scans at a variety of fequencies, gains, and signal types at each of the respective angles the signal could travel. In the current sensor layer, the piezoelectric sensors are equally spaced in the X and Y directions limiting the angles the waves have to travel to ±ninety degrees (±90°) and ±forty-five degrees))(±45°). The scans are run on un-damaged panels to allow for the user to analyze the data and identify trends as to which set of parameters yields the highest sensitivity. The sensitivity of the system can be identified through an analysis of the sensed signal strength in an undamaged panel. Sets of parameters yielding higher sensitivity will have higher received signal strength in undamaged panels, while sets of parameters with lower sensitivity will have lower received signal strength in undamaged panels. The selection of sensitivity is directly related to the type of and extent of damage being identified by the system.

The preferred panels are capable of identifying and healing damage of a least ninety-five percent (95%) of original form and can be designed to heal one-hundred percent (100%) of original form. The preferred panels fabricated are 12"×12" squares with integrated piezoelectric sensing layers at the mid-ply and Kapton® encapsulated foil etched heating elements 21 capable of discrete heating co-cured at the top ply. The preferred DMR is a styrene healable SMP resin system due to the maturity of the system as well as its ability to consistently heal over ninety percent (90%) of damage.

Using this process those of skill in the art will be able to generate the proper set of scanning parameters for subsequent panels quickly. This is important for the commercial fabrication of the panels. The obvious design goal of this process is to develop a set of panels with optimized performance of heater design and minimize the parasitic weight of the panels through the reduction of weight associated with non-structural components in other healing systems.

The preferred design has minimized the thermal gradient and thermal uniformity through the reduction of bus bar width. The bus bars are ⅛ inch copper bus bars connected to the 1 inch center heaters. The most preferred design incorporates foil etched leads that homerun to a central location and are connected with surface mount connecters. This modification reduces the weight penalty of system integration through the elimination of 22-guage wire conductors. To further add robustness to the design of the integrated heater a conformal surface coating is applied to the diodes to both protect the diode as well as provide a layer of electrical insulation.

Based on the current reflexive system design the heater is integrated at the top ply of the structure for multiple reasons including ease of diode repair as well as a result of the lack of electrical insulation in carbon fiber. One large trade-off of integrating the heater at the top ply is the heat losses to the surrounding ambient environment associated with the placement. A much more efficient design is to integrate the heater at the mid-ply of the composite to maximize the generated heat into the composite structure.

To integrate the heater to the control system, Molex pin connecter and 22 gage wire bundles are used. Following the damage prioritization and selected healing cycle the control system applies a voltage drop across the selected leads to generate heat. This approach is the most streamlined approach, however due to the design of the control system this approach only allows for the application of 5V to each heater. To increase the range of performance of the system, an interface running between the control system and the discrete heater can be fabricated. The interface is comprised of mechanical relays and a DC power supply that will allow both a higher and lower voltage drop to introduce more or less heat based on both the resin formulation and ambient conditions. This interface will also allow a control system or human operator to determine what power densities are required to heal composites of different thicknesses and ply schedules.

Figure 6:
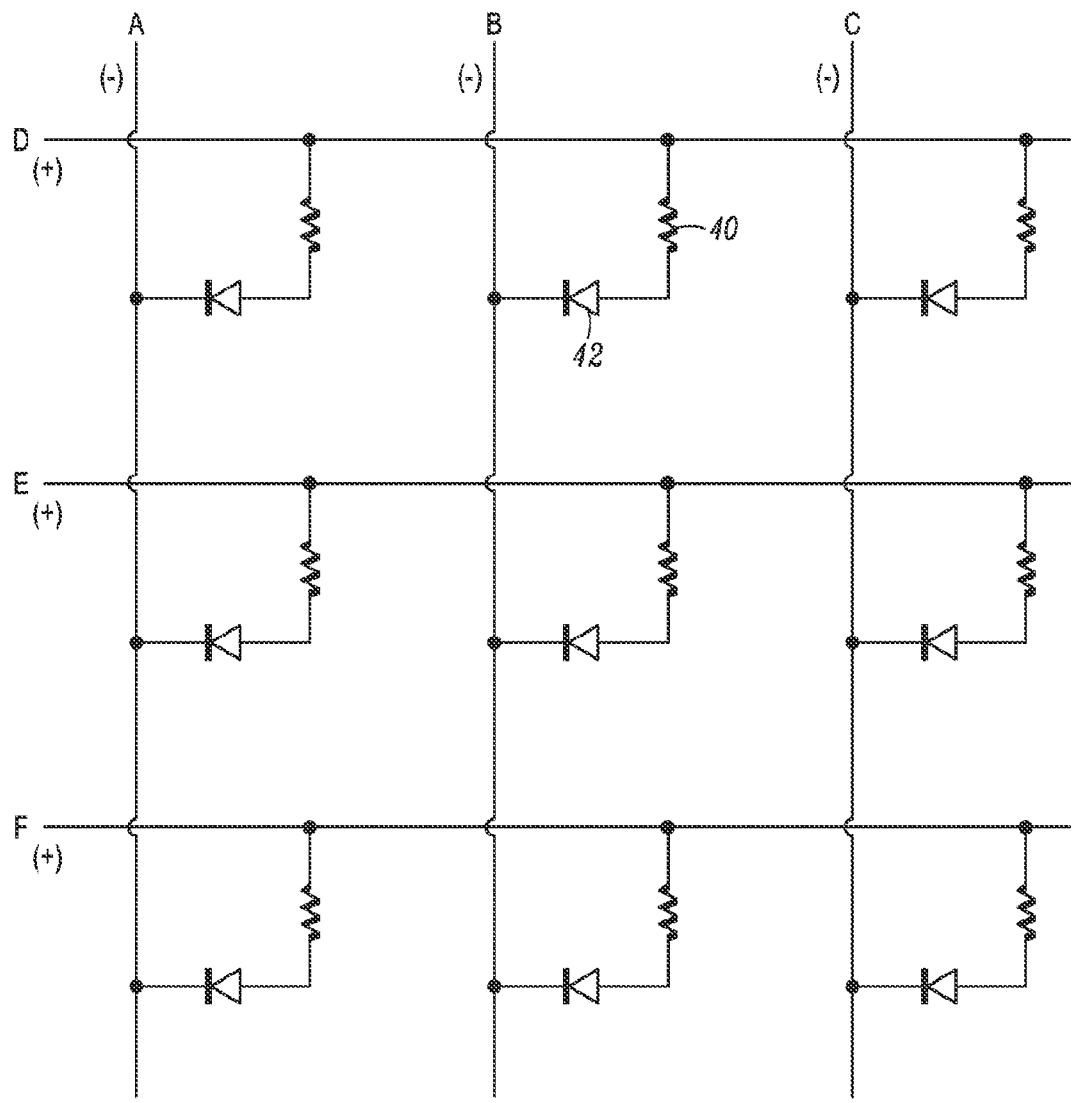
FIG. 6 shows an electrical schematic of a three heater by three heater section of the preferred heater panel design.

An electrical schematic of the selective nature of the heaters is shown in FIG. 6. The array of horizontal lines, D, E, and F and vertical lines, A, B, and C in FIG. 6 represent bus bars with the ability to supply power to locally heat the small resistive heating elements once the bus bars are connected to a power source. The bus bars can be connected to a power source manually or through switches that turn the power on or off. The heating elements are represented by the commonly accepted resister symbol. Additionally, diodes are placed in-line with the resistive heating elements and only allow the current to flow in one direction through the circuit. The vertical and horizontal bus bars are electrically insulated from each other where they meet. This electrical isolation between the horizontal and vertical bus bars allows current to only flow one way through the system of parallel circuits resulting in localized activation without bleed-off to surrounding heaters. For example, as shown in FIG. 6, if power is connected to Bus Bars D and B, then current can only flow through one heating element, 40, because of the in-line diode, 42. Additionally, it will be apparent to those of skill in the art that the amount of heat generated is controlled by the amount of power applied to the elements.

The preferred embodiment consists of multiple components, including an integrated piezoelectric sensor, a computer and algorithm capable of analyzing the change in wave propagation to identify damage, a polymer matrix composite with modified SMP resin capable of healing with the application of heat, and a DC power supply interface and mechanical relay instrument that allows to vary the voltage drop across the resistive heating elements. This system has demonstrated the ability to successfully identify damage, heal the damage and verify a restoration of mechanical properties.

The delivered control system has the ability to import data generated from the Acellent structural health monitoring (SHM) system, analyze and prioritize the damage based on user defined criteria, determine the appropriate healing cycle, and apply a voltage drop across the appropriate heaters all while keeping the user informed of its status on a LCD monitor. The control system is comprised of a custom printed circuit board, DC power supply and associated capacitors, programmable microprocessor, custom enclosure, and cooling fan.

As part of the functionality of the Acellent (SHM) system, a variety of tailorable functions exist that dictate how well the system monitors the health of the structure. These functionalities are built into the system to allow for its application to multiple structures comprised of varying shapes, sizes, and materials. The functionality of the system allows the user to define such criteria as wave form, frequency, gain, sampling points, and other functionalities.

The first step in integration of the sensor system with the composite structure is to tune in the SHM functionality to identify varying types of damage. If the system is not tuned into the structure properly, the SHM system will not identify the damage with the proper magnitude and location. Due to the unlimited number of potential combinations of variables, a matrix design approach varying only one criterion at a time while keeping the others constant is preferred. After each run it should be noted how well each combination of variables identifies the damage location and what the magnitude of damage was. The results of this effort will yield a more complete understanding of the SHM system and how each variable affects the accuracy of the scans. One critical piece of information that is gained during this effort is the recognition that when dealing with integrated SHM of an an-isotropic composite structure the wave forms propagate differently when going in the direction of the fibers, such as at zero (0) or ninety (90) degrees, or when going at an angle to the fibers of forty-five degrees (±45°). The completion of this investigation results in the identification of a combination of variables that allow the SHM to use the same parameters between reflexive composite structures fabricated using the same ply schedule and processing methods. Thus for every type of ply schedule and processing method, these tests should only be needed to be run once.

A critical component to the successful integration of each subcomponent into a functional reflexive system is the ability for the control system to read, interpret and interoperate the output data from the SHM system. To accomplish this task, an added functionality of the SHM system to output an ASCII file of the raw data comprised of location and magnitude information was devised by Acellent Technologies. The ASCII files are named by date and a post-script number that identifies which is the most recent data file when more than one data file is created per day. The intelligent structural control system then imports the raw data and looks at the data based on user defined criteria that includes damage magnitude, damage location, physical size of damage, and other parameters that were deemed relevant. Based on these criteria, the control system assigns a damage value to each damage location for prioritization. The location with the highest damage prioritization is healed first.

Control and Operation

Figure 7:
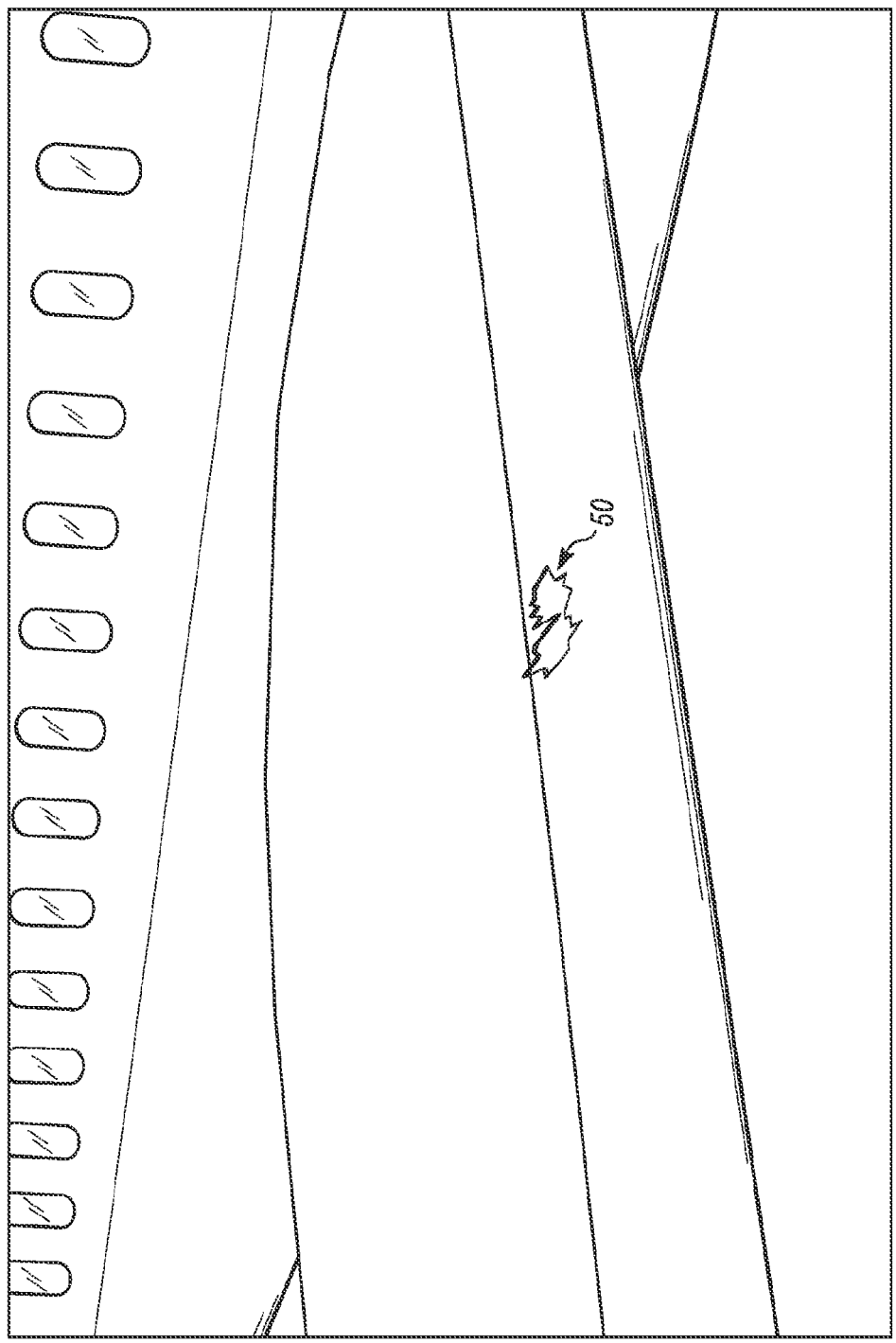
FIG. 7 is a perspective drawing showing damage to an aircraft wing.
Figure 8:
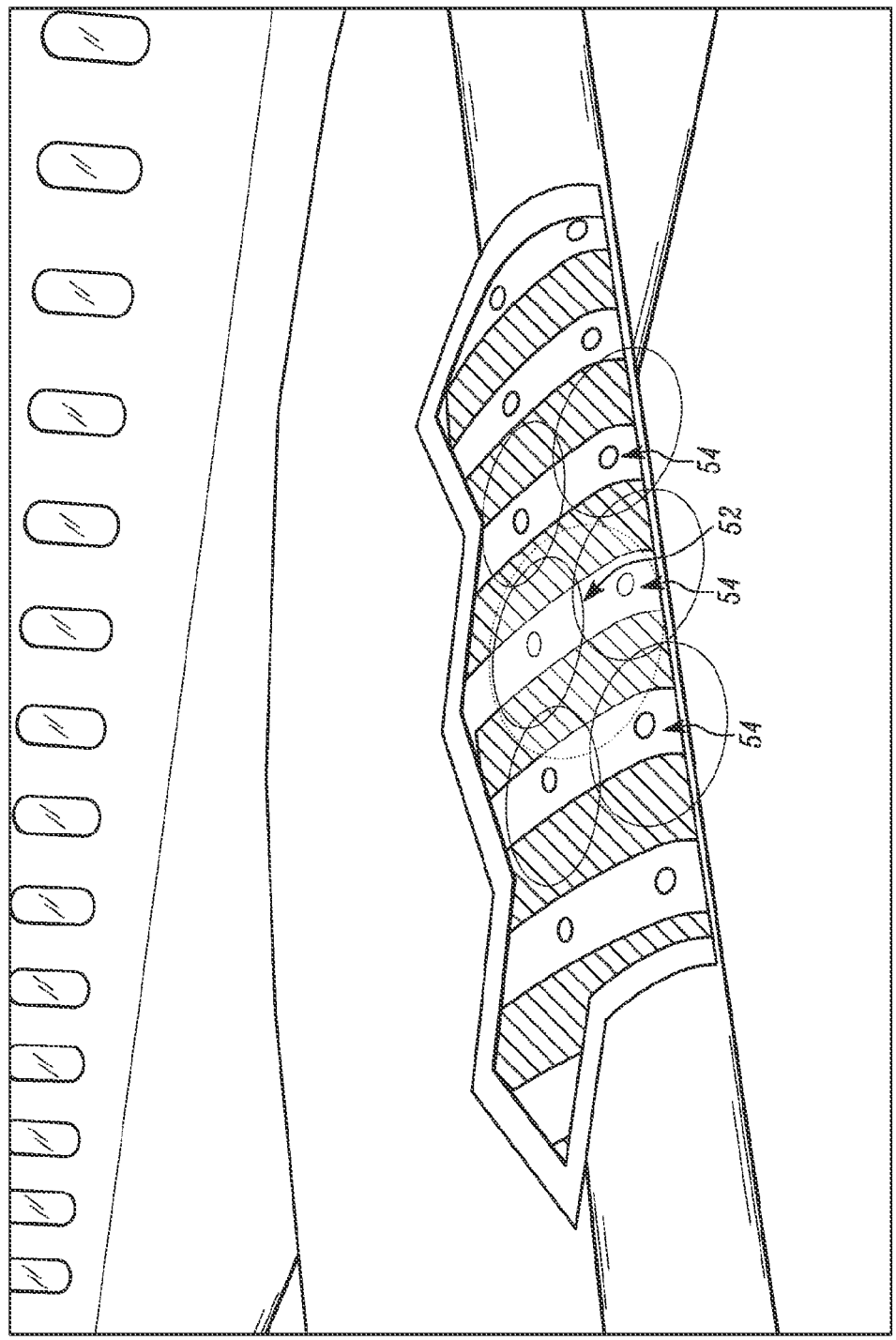
FIG. 8 is perspective drawing showing the sensing system used to detect damage in an aircraft wing.

In order to optimize the control system, it is necessary to determine an appropriate algorithm to prioritize the damage locations, if multiple impacts were to occur, as well as develop a method to address damaged areas in the event that the damaged area required more power to heal than is provided by the system. By evaluating what would be most important to increasing the survival of a product and then using a priority ranking system to weigh each aspect an algorithm and system can be easily developed by those of skill in the art. Aspects to consider in creating the algorithm and system include, size, magnitude, location, and magnitude of surrounding rankings. Using the algorithm, each damage area is assigned a numerical value for direct comparison with other damage sites. The control system then finds the highest number and begins by healing that area first. Those of skill in the art should be able to design an algorithm to prioritize the damage locations, if multiple impacts were to occur, as well as develop a method to address damaged areas in the event that the damaged area required more power to heal than is provided by the system The process is shown in FIGS. 7-11. In FIG. 7, a damaged area, 50, is shown. The causes of the damage, or the products on which the damage occur, are irrelevant, however, for the purposes of this description the damage has occurred on the wing of an aircraft. In FIG. 8, the sensors, 54, of the sensing system, have detected damage in an area, 52, of the wing. The system will next determine if the damage can be healed in one step or requires multiple, sweep, healing. Upon identification of the damage location with the highest prioritization, the control system will then look at how many heaters are required to heal the damage at that location. This step is completed by examining the physical size of the damage and the magnitude of the surrounding areas of the damage. To mimic an aircraft environment and to minimize the stiffness change in the composite structure, limited the number of heaters that can be activated at any given time to six (6), which corresponds to a six (6) inch square physical area. If a damage area requires more than six (6) heaters to be activated to heal the damage the system beings a sweep healing process that activates six (6) heaters for healing then activates six (6) adjacent heaters and so forth until the entire damage area is healed. The system also has a top end limit of heaters that the system will activate at any given time before it recommends a system abort. If the damage magnitude is too large or extreme for the reflexive system to repair, the system will recommend an ejection or replacement of the part.

Figure 9:
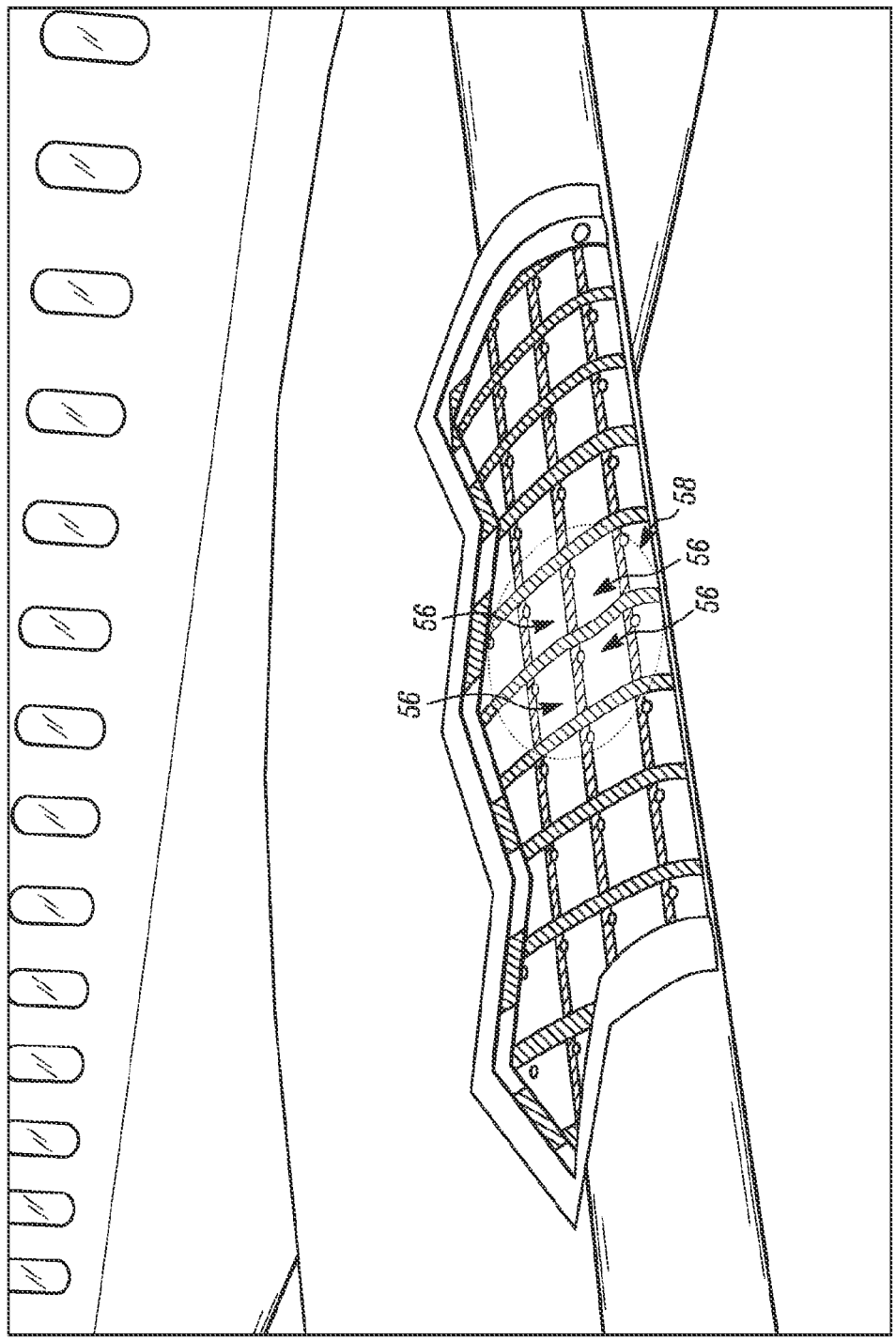
FIG. 9 is a perspective drawing showing the heating system selectively activating heaters to heal the damage in the aircraft wing.

After the scan of the damage area is complete, a file is generated, downloaded and processed in order to determine the location(s) requiring healing. The algorithm used for this processing includes two modes. Mode one operation includes default values for all parameters and thresholds. Mode two operation prompts the user to select the parameters used for processing. The results of this algorithm are passed to the "healing algorithm" which selectively activates a 10 heater× 10 heater power grid of 12"×12" in physical size in order to heat and thus heal target areas as shown in FIG. 9. In. FIG. 9 the heaters, 56, are selectively activated by the control system so that the damaged area, 58, is raised above its Tg and healed.

While automatic control systems to determine the amount of damage and the proper sequence of healing and activation are preferred, the system can be designed so that a human user can determine and activate the proper sequence. Alternatively the system can be designed for control by an automatic system or user input depending on the damage and available time to repair the product.

Figure 10:
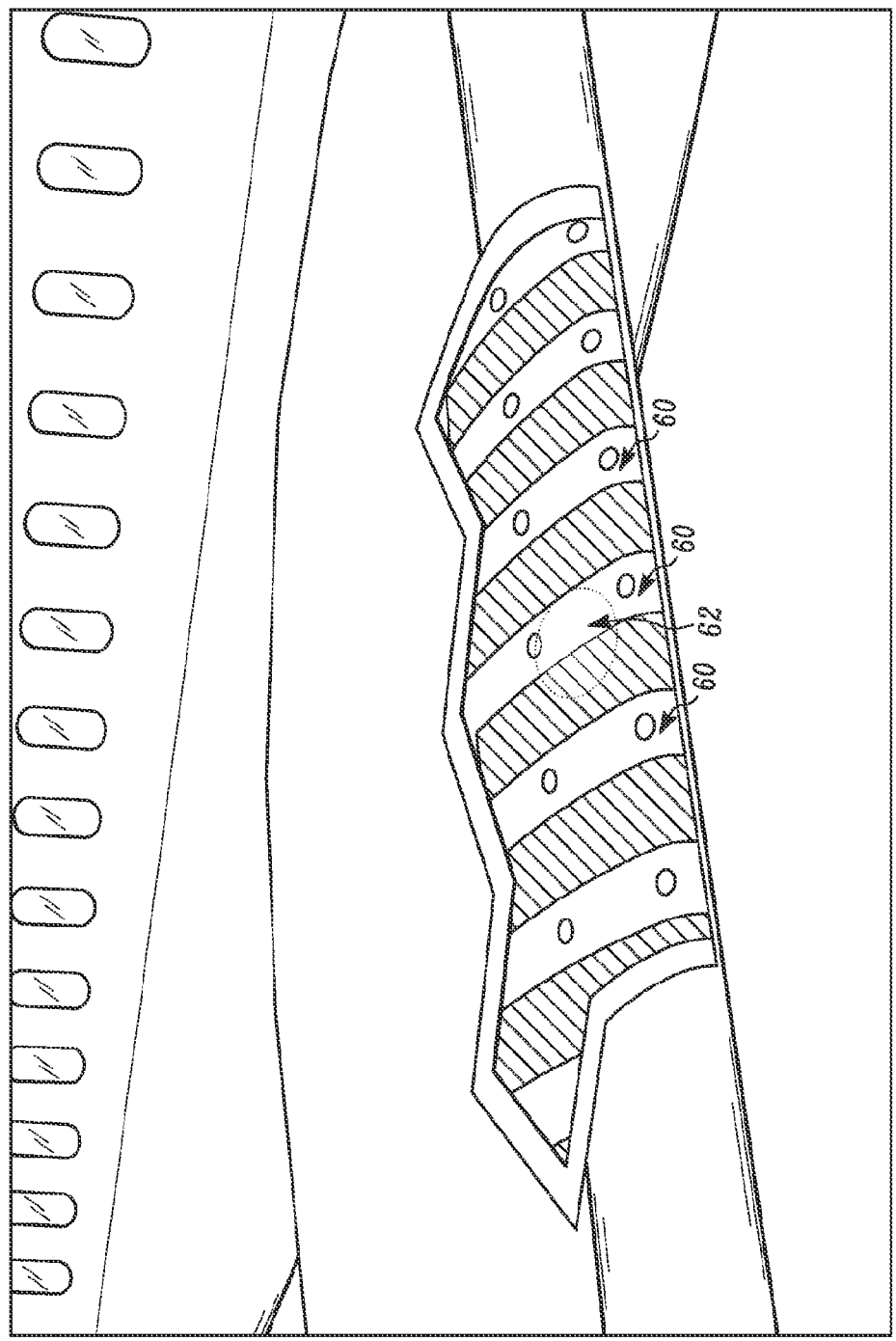
FIG. 10 is a perspective drawing showing the sensing system detecting that the damage has been healed.
Figure 11:
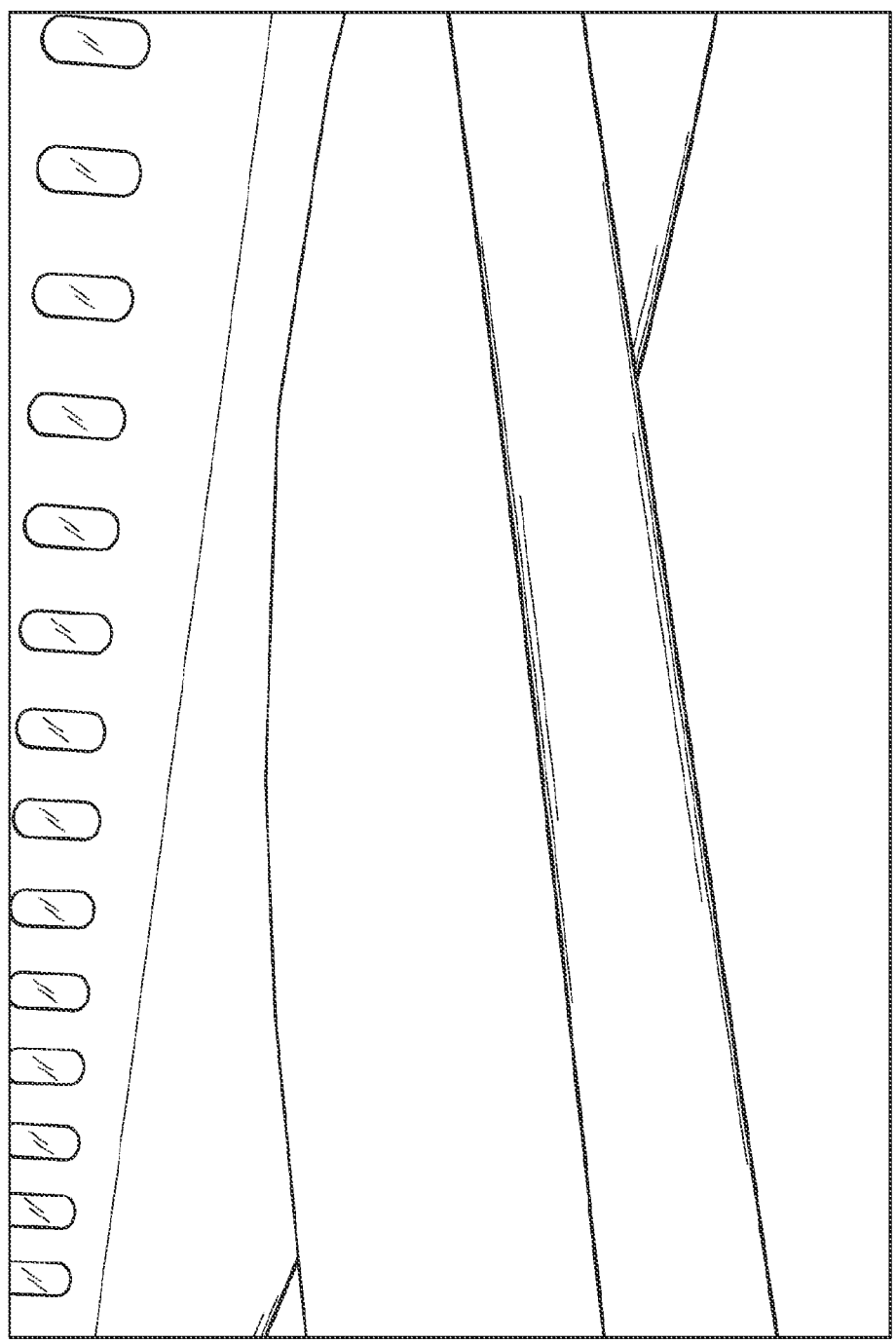
FIG. 11 is a perspective drawing showing that the damage to the aircraft wing has been healed.

Once the "Active Healing" cycle is complete, the user is prompted to initiate another inspection of the product using the Acellent system as shown in FIG. 10 after the temperature of the panel has been lowered below the Tg. In FIG. 10, the sensors, 60, determine that the area, 62, has been healed. Then the above procedure is repeated until the healing algorithm determines that no additional healing is needed as seen in FIG. 11. During this entire process, the user is constantly updated with the status of the healing via a graphical LCD display panel. A portable yet powerful Rabbit Semiconductor microcontroller is the preferred heart of the control system, and it has been used to demonstrate the capability of monitoring the files and downloading the files as needed for processing. The isolated power drive circuits have been designed and tested as well. These include GMR (giant magnet-resistive) sensors to serve as a low cost, and miniature means for current measurement of all power lines feeding the healing grid. The traditional means for current measurement include bulky and expensive coil packages. This GMR current information will be useful in identifying open power lines due to severe impact damage. In the event of an open power line, power will be rerouted to the surrounding closed lines for healing. This feature would be used in the event of puncture damage or severe impact damage.

INDUSTRIAL APPLICABILITY

The claimed method and devices can be used to create a self-healing system for aircraft, automobiles, buildings, other structures, and any product that uses resins or composites.

What is claimed is:
1. A self-healing system comprising:
   at least one composite panel formed from a cured product of stacked plies, the stacked plies comprising:
      a first ply of an adaptive structure comprising a shape memory polymer chosen from thermoset shape memory polymers and thermoplastic shape memory polymers;
      a second ply comprising an array of heater sections formed from a matrix of discrete heating elements, wherein each discrete heating element is configured to heat a region corresponding to a single heater section; and
      a third ply comprising a sensor grid array;
   a damage detecting system that sends a waveform to the sensor grid array and receives a response from the sensor grid array to produce a data set;

a control system that analyzes the data set to determine at least one damage location of damage to the at least one composite panel, determines a target healing area based on the damage location, and selectively activates and deactivates individual heating elements of the matrix of discrete heating elements to cause localized heating in the target healing area that activates a combination of self-healing mechanisms in the adaptive structure, the combination of self-healing mechanisms comprising shape memory effect and reptation.

2. The self-healing system of claim 1, wherein the shape memory polymer is a thermoset shape memory polymer.

3. The self-healing system of claim 2, wherein the thermoset shape memory polymer is a styrene-based shape memory polymer.

4. The self-healing system of claim 2, wherein the thermoset shape memory polymer is an epoxy-based shape memory polymer.

5. The self-healing system of claim 1, wherein the adaptive structure is a composite of the shape memory polymer and a reinforcement embedded in the shape memory polymer, the reinforcement chosen from continuous fibers, fiber mats, chopped fibers, fiberglass, spandex, nanoparticles, carbon nanofibers, and carbon nanotubes.

6. The self-healing system of claim 5, wherein the shape-memory polymer is a thermoset styrene-based shape memory polymer and the reinforcement comprises carbon fibers.

7. The self-healing system of claim 1, wherein the second ply is between the first ply and the third ply.

8. The self-healing system of claim 1, wherein the third ply is between the first ply and the second ply.

9. The self-healing system of claim 1, wherein the control system comprises a printed circuit board, DC power supply, capacitors, a computer, programmable microprocessor, and cooling fan.

10. The self-healing system of claim 1, wherein the control system further comprises an interface between the control system and the individual discrete heating elements.

11. The self-healing system of claim 10, wherein the interface comprises a power source and switches that turn the power source on or off to vary a voltage drop across the individual discrete heating elements.

12. The self-healing system of claim 11, wherein the switches are mechanical relays.

13. The self-healing system of claim 1, further comprising a monitor coupled to the control system, the monitor adapted to display status information to a user about a healing process being controlled by the control system.

14. The self-healing system of claim 1, wherein the control system determines multiple damage locations and target healing areas, assigns a damage value to each damage location, and prioritizes activation and deactivation of the individual discrete heating elements of each target healing area according to the damage values of each damage location.

15. The self-healing system of claim 1, wherein the damage detecting system is a continuous health and performance monitoring system.

16. The self-healing system of claim 15, wherein the continuous health and performance monitoring system comprises an embedded piezoelectric sensor system.

17. The self-healing system of claim 1, wherein the control system is a computer control system interfaced with the sensor grid array.

18. The self-healing system of claim 17, wherein the computer control system:
 a. compares a baseline data set against a first new data set;
 b. determines a healing process based on the comparison between the baseline data set and first new data set;
 c. creates a set of tasks capable of being carried out in the proper sequence by a machine to execute a healing process; and
 d. compares the baseline data set against a second new data set to determine when the healing process is complete.

19. The self-healing system of claim 1, wherein the individual discrete heating elements are etched foil heaters.

* * * * *

UNITED STATES PATENT AND TRADEMARK OFFICE
CERTIFICATE OF CORRECTION

PATENT NO. : 9,180,632 B2
APPLICATION NO. : 14/198091
DATED : November 10, 2015
INVENTOR(S) : Christopher Douglas Hemmelgarn et al.

Page 1 of 1

It is certified that error appears in the above-identified patent and that said Letters Patent is hereby corrected as shown below:

On the title page

(72) Inventors: "Christopher Douglas Hemmelgarn, Miamisburg, OH (US); Thomas Wood Margraf, Centerville, OH (US); David Ernest Havens, Bellbrook, OH (US); John Lewis Reed, West Salem, OH (US); Logan Wayne Snyder, Fairborn, OH (US); Anthony Louderbough, Cincinnati, OH (US); Benjamin Allen Dietsch, Dayton, OH (US)"

should read

(72) Inventors: --Christopher Douglas Hemmelgarn, Miamisburg, OH (US); Thomas Wood Margraf, Jr., Centerville, OH (US); David Ernest Havens, Bellbrook, OH (US); John Lewis Reed, Jr., West Salem, OH (US); Logan Wayne Snyder, Fairborn, OH (US); Anthony Louderbough, Cincinnati, OH (US); Benjamin Allen Dietsch, Dayton, OH (US)--.

Signed and Sealed this
Twelfth Day of July, 2016

Michelle K. Lee
*Director of the United States Patent and Trademark Office*